D. MILLIKEN.
Car-Starters.

No. 151,308. Patented May 26, 1874.

Witnesses:
Arthur C. Fraser.
Charles M. Higgins.

Inventor.
David Milliken
Per Burke & Fraser
att'ys.

UNITED STATES PATENT OFFICE.

DAVID MILLIKEN, OF NEW YORK, N. Y.

IMPROVEMENT IN CAR-STARTERS.

Specification forming part of Letters Patent No. 151,308, dated May 26, 1874; application filed April 10, 1874.

*To all whom it may concern:*

Be it known that I, DAVID MILLIKEN, of the city, county, and State of New York, have invented certain new and useful Improvements in Car-Starters, of which the following is a specification:

My invention relates to that class of car-starters in which a clutched winding-drum is arranged upon one of the axles, on which is wound a chain connected with a spring; and it consists in the combination therewith of a hand-lever for engaging or disengaging said winding-drum, combined with a foot-lever for operating the brake, by means of which the operator is enabled to readily control the operation of the apparatus and the movements of the car.

Figure 1:
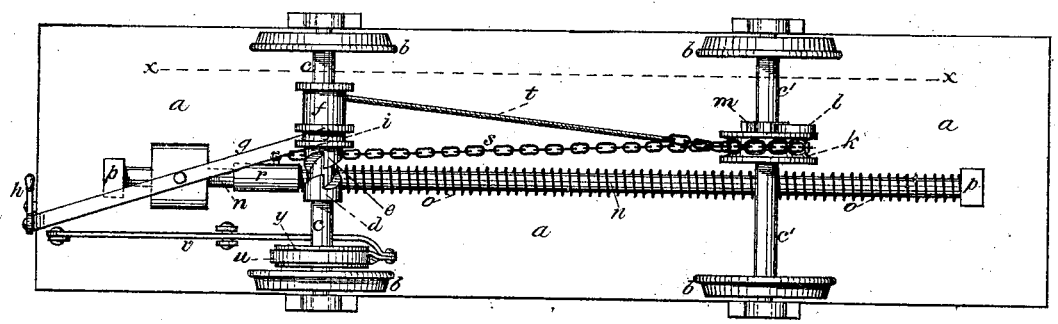
Figure 2:
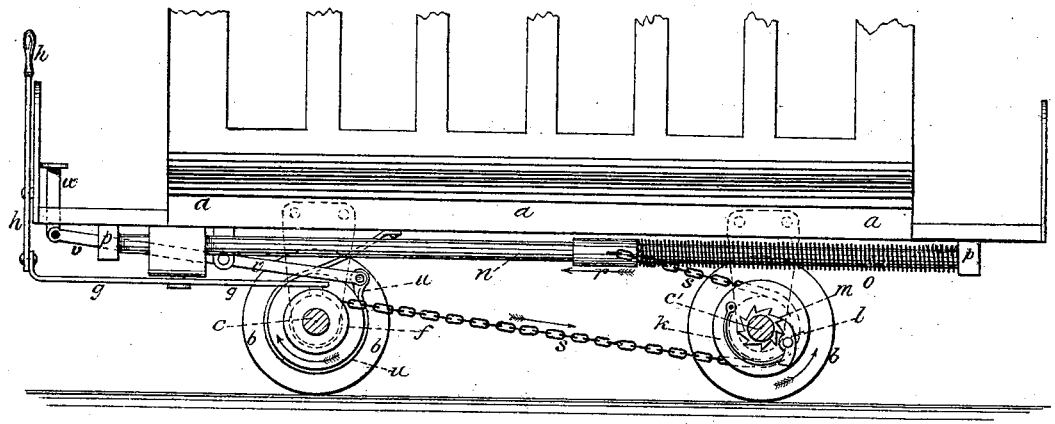

Figure 1 of the accompanying drawings is a plan view of the apparatus viewed from the under side of the car, the spring being shown expanded; and Fig. 2 is a side elevation of the same, showing the spring compressed, the wheels and supporting-brackets being removed from the side nearest the observer, and the axles shown in section on line $x\,x$ of Fig. 1.

As represented in the drawings, $a\,a$ is the body of the car, which is supported in the usual manner upon the wheels $b\,b$, which are rigidly secured to the axles $c\,c'$, as usual. A drum, $f$, is arranged loosely upon the front axle $c$, and is capable of sliding longitudinally thereon, and on one of its ends is formed one-half, $e$, of a toothed clutch, the approximate half $d$ being secured immovably to the axle. The teeth of the clutch are of the ratchet or sloped kind, so that they engage in one direction only, as shown. A lever, $g$, is pivoted to the under side of the car, and it is connected with the drum by means of a projection upon its inner arm, which rests in the groove $i$ on the drum, as seen in Fig. 1. The outer arm of the lever $g$ is connected with the hand-lever $h$ pivoted to the front dash-board, and rising to within convenient distance of the hand of the driver, so that by moving the lever one way or the other the winding-drum $f$ by means of the clutch $d\,e$ becomes engaged with, or disengaged from, the axle $c$. Upon the front axle is fixed a brake-wheel, $y$, and its periphery is embraced by a friction-strap, $u$, connected with a lever, $v$, pivoted to the under side of the car, and operated by the foot-rod $w$ convenient to the foot of the driver, so that the brake can be easily operated to regulate the degree which the starting-spring may be compressed by checking the car at any point desired. A chain-wheel, $k$, is arranged upon the rear axle, and is loose thereon, but provided with a pawl, $l$, which engages with the ratchet-wheel $m$ fixed to the axle, so that the chain-wheel engages with the axle in one direction only, viz., when the spring is released and expands. A rod, $n$, is secured longitudinally to the under side of the car close to the floor, and upon it is placed a strong spiral spring, $o$, one end of which rests against one of the supporting-brackets $p$, and the other end against a sleeve, $r$. A chain, $s$, is attached to the sleeve $r$, passes around and engages with the wheel $k$ upon the rear axle, extends to the front, and connects with the upper side of the winding-drum $f$ upon the front axle. A short piece of wire-rope, $t$, connected with the chain and drum, is preferably employed for winding upon the drum, as seen in Fig. 1.

The operation is as follows: When the car is moving forward, and it is desired to stop it, the driver moves the hand-lever $h$ to the right, by which the drum $f$ engages with the clutch $d$, and partakes of the motion of the axle $c$, which, thereby, winds up the chain, rotates the chain-wheel $k$, which slips free of the rear axle in this direction, pulls back the sleeve $r$, and thus compresses the spring $o$. The winding of the chain and compression of the spring continue till the resistance of the spring is sufficient to overcome the momentum of the car, and cause it to stop. The power thus accumulated by the compression of this spring is exerted in starting the car, and it will be observed, by referring to Fig. 2, that when the spring is compressed and the winding-drum engaged, as represented in that figure, each wheel tends to revolve in opposite directions, the effect being that the car remains stationary, but as soon as the drum is disengaged by the reverse movement of the hand-lever, it being then free to revolve independently of the front wheels, all the power of the spring is consequently exerted through the chain s upon the chain-wheel k, which then becomes engaged with the rear wheels, and the expansion of the spring and consequent motion of the chain rotate the chain-wheel, and with it the rear axle and wheels, and thus impart a strong propelling impulse to the car, which overcomes its inertia and moves it forward bodily. By means of the foot-rod w connecting with the brake, and the hand-lever h connecting with the winding-drum, the driver is enabled to manipulate and control the operation of the apparatus with ease and convenience.

It will be observed that the ratchet and pawl on the rear wheels prevent the car from being backed without compressing the spring. This is of advantage in ascending an incline, in which case it prevents the car from backing down when stopped. When it is required to back the car the pawl may be disengaged by suitable mechanism, with which it may be connected, or the ratchet and pawl may be dispensed with and the chain-wheel engaged or disengaged with the rear axle, as required, by means of a clutch similar to that on the front axle, if preferred.

I claim as my invention—

In combination with the drum f, wheel k, chain s, and spring o, the hand-lever h and lever g for operating the winding-drum, and the foot-rod w and lever v for operating the brake, as set forth.

In witness whereof I have hereunto signed my name in the presence of two subscribing witnesses.

Witnesses:       DAVID MILLIKEN.
  J. FRASER,
  CHARLES M. HIGGINS.